United States Patent
Böhm et al.

(10) Patent No.: US 6,625,230 B1
(45) Date of Patent: Sep. 23, 2003

(54) MULTI-FREQUENCY SUPERPOSITION RECEIVER METHOD

(75) Inventors: Konrad Böhm, Blaustein (DE); Johann-Friedrich Luy, Ulm (DE); Thomas Müller, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/389,074

(22) Filed: Sep. 2, 1999

(30) Foreign Application Priority Data

Sep. 2, 1998 (DE) .......................... 198 39 895

(51) Int. Cl.⁷ .................. H04L 27/22; H04L 27/30; H04B 1/74
(52) U.S. Cl. .................. 375/316; 375/150; 370/484
(58) Field of Search .................. 375/316, 150, 375/133, 219, 224, 260, 340; 370/484, 517, 200

(56) References Cited

U.S. PATENT DOCUMENTS

| | | | |
|---|---|---|---|
| 5,483,529 A | * 1/1996 | Baggen et al. | ............... 370/484 |
| 5,870,426 A | * 2/1999 | Yokev et al. | ................ 375/133 |
| 6,069,915 A | * 5/2000 | Hulbert | ...................... 375/150 |
| 6,434,186 B2 | * 8/2002 | Dowling | ..................... 375/147 |

FOREIGN PATENT DOCUMENTS

| | | |
|---|---|---|
| DE | 41 27 501 A1 | 3/1992 |
| DE | 41 30 863 C2 | 3/1993 |
| DE | 42 08 808 A1 | 9/1993 |

* cited by examiner

*Primary Examiner*—Stephen Chin
*Assistant Examiner*—Edith Yeh
(74) *Attorney, Agent, or Firm*—Davidson, Davidson & Kappel, LLC

(57) ABSTRACT

A method of receiving data signals having identical contents and different frequencies. The frequency position of the data signals is analyzed by means of an FFT, and the signals are down-converted to the same intermediate frequency. The frequencies are selected such that the partial waves are constructively superpositioned, thereby improving the signal-noise ratio in the sum.

9 Claims, 2 Drawing Sheets

MULTI-FREQUENCY SUPERPOSITION RECEIVER METHOD

CROSS-REFERENCE TO RELATED APPLICATIONS

Priority is claimed herein with respect to Application No. 198 39 895.6 filed in the German Patent Office on Sep. 2, 1998, the disclosure of which is incorporated herein by reference.

BACKGROUND OF THE INVENTION

The invention relates to a method of receiving and superpositioning radio signals having identical contents and different frequencies.

Telecommunications systems for decoding, equalizing and receiving radio signals, such as are already realized in numerous modular units in, for example, Viterbi decoders, RAKE receivers and lattice equalizers, edit the data stream. The European Patent publication EP 0 492 419 B1 discloses a Viterbi decoder system having an equalizer with variable properties. The equalizer includes a transversal filter structure and time-delay members for a time unit delay by 1 bit. A weighting of the partial signals of the data stream read into the equalizer allows the wave shape of the input signal to be modified and equalized. The signal components are re-added prior to an A/D conversion for further digital processing.

In the known solutions, however, frequency shifts due to the Doppler effect are not detected and corrected completely, or at all.

It is the object of the invention to provide a method with which the receiving capability, and particularly the receiving capability of moving objects, is increased.

SUMMARY OF THE INVENTION

The above object generally is achieved according to the present invention by a method of receiving data signals having identical contents and different frequencies, wherein: the frequency position of the data signal is analyzed by use of an FFT; this analysis is used to control local oscillators for mixing the input frequencies to IF signals such that, through separate mixing of the data-signal components, the individual partial waves are frequency-corrected to a common IF mean frequency; and thereafter the frequency corrected individual partial waves are superpositioned. Further advantageous embodiments and modifications of the invention are disclosed.

The crux of the invention is the superpositioning of received signals having identical contents and different frequencies. The difference in frequency can be caused by different frequencies when the signal is being transmitted by one or more transmitters, or by a Doppler shift of a plurality of partial waves due to a moving receiver.

The invention includes a method in which the frequency position of the data signal is analyzed by means of an FFT, and this analysis is used to control local oscillators for mixing the input frequencies to IF signals. Through separate mixing of the data-signal components, the frequencies of the local oscillators are selected such that the individual partial waves are frequency-corrected to a common and unified IF mean frequency, and these partial waves are then superpositioned. The spectrum of the received signal, which is determined by the FFT, defines the frequencies of the local oscillators.

The mixing to IF signals through separate mixing stages is effected in analog form prior to an A/D conversion, or digitally after an A/D conversion.

Digital mixing is primarily suitable for correcting small frequency shifts, such as those that occur in a Doppler shift. For each branch, different signal transit times of the partial waves can be matched to one another and compensated by time-delay members.

An FFT analysis of different frequencies also involves a transmission of the signal by one or more transmitters. Doppler-shifted partial waves are also analyzed in the FFT analysis, with the position relative to the transmitter and the inherent speed of the receiving object being utilized in the analysis.

In a superpositioning of the frequency-corrected partial waves, which are consequently at the same IF mean frequency, a weighting related to the respective signal level is effected.

An advantage of the invention is that the overall receiving capability can be increased through a reception from a plurality of transmitters.

The improvement in the receiving quality is especially advantageous in moving receivers. Here, frequency shifts that are stipulated by a Doppler shift are completely corrected.

The invention is described below by way of advantageous embodiments, with reference to schematic drawings in the figures.

DETAILED DESCRIPTION OF THE PREFERRED EMBODIMENTS

Figure 1:
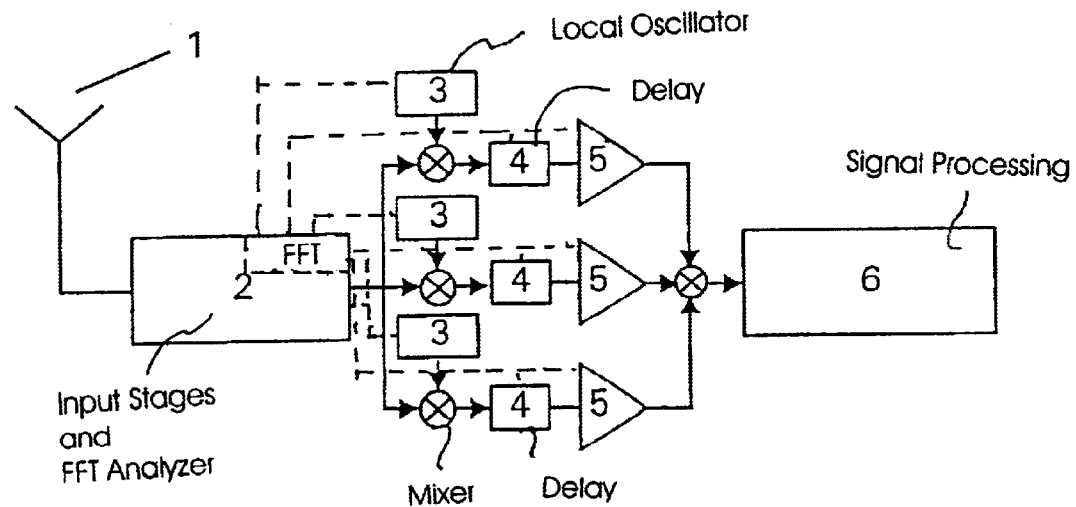
FIG. 1 is a block diagram of an analog receiver making a downward conversion with a frequency correction.

In a first embodiment, according to FIG. 1, an HF signal is distributed for frequency correction to a plurality of local oscillator stages 3 via a receiving antenna 1 and front end stages 2. The high Frequency signal is additionally subjected to a FFT analysis to provide control signals to the respective local oscillator stages 3 and other controlled components of the respective circuit branches. Each local oscillator stage 3 converts the received HF signal, with a frequency that is predetermined for it as a result of the FFT, down to a common mean intermediate frequency (IF). The respective frequencies assumed by the local oscillator stages 3 are determined from the frequency-shifted components of the received signal by way of an FFT. The time delay may be compensated by way of controlled delay members 4. Before the IF signals having a unified or common frequency are combined, they are weighted by respective amplifier unit 5 for level adaptation based on the relative amplitude of the respective component. When all partial signals are combined or superpositioned, an optimum receiving capability results for further digital signal processing in a processor 6.

Figure 2:
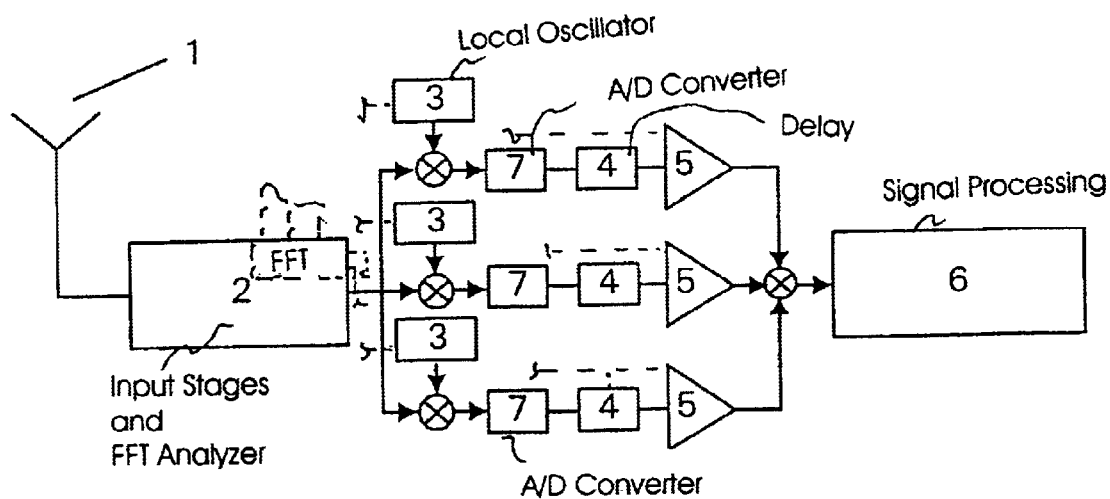
FIG. 2 is a block diagram of a receiver with an analog frequency correction followed by digital processing.

The second embodiment, according to FIG. 2, is a variation of the first embodiment, in which an A/D conversion is provided after the local oscillator stages 3 for the IF range by respective A/D converters 7. Consequently, the respective time-delay members 4 and the respective amplifier units 5 are disposed in the region of the digital signal processing for weighting the signal level.

Figure 3:
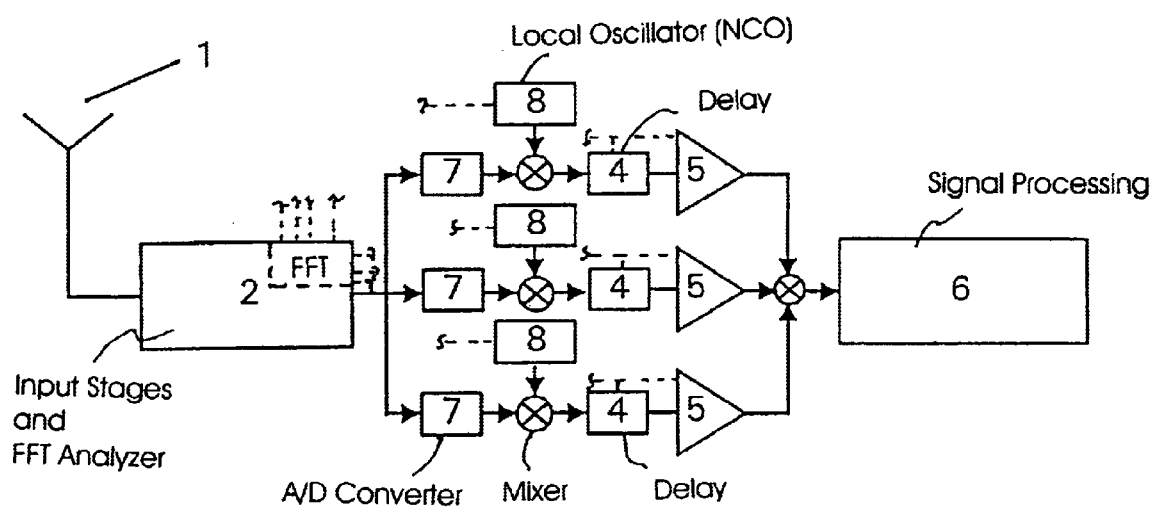
FIG. 3 is a block circuit diagram of a receiver with a digital frequency correction.

In a third embodiment, according to FIG. 3, an A/D conversion is performed by respective A/D converters 7 before the local oscillator stages 8. Numerically Controlled Oscillator (NCO) units are used as the respective stages 8 for a digital mixing in the respective mixers. Therefore, the entire signal processing is digital.

The method is applied in the architecture illustrated in the figures, to, for example, VHF receivers in automobiles. If a transmitter transmits on different channels, the contents of the transmitters can be constructively superpositioned prior to the demodulation, thus improving the signal-noise ratio. Because radio holes are generally frequency-specific, the radio holes that are perceptible as rapidly fading in transit are bridged, and this channel diversity attains a continuously good reception. Signals having a smaller frequency difference could result from a Doppler shift in multipath propagation. A correction of this frequency shift in accordance with the above-cited document helps to reduce the distortion factor of the receiver.

Ideally, the signals are broadband digitized, transferred into the base band with the aid of digital mixers and digitally filtered there. Corresponding to the average signal amplitude, the signals are weighted and constructively superpositioned. At the same time, it is possible to determine the exact phase and frequency of the different signals with the aid of an FFT, and thus set the numerically-controlled local oscillators to the correct frequency.

A further application lies in the mobile reception of CDMA signals. In contrast to conventional RAKE receivers, in this case it is possible to better predict the phase with little calculation.

The invention has been described in detail with respect to Preferred embodiments, and it will now be apparent from the foregoing to those skilled in the art, that changes and modifications may be made without departing from the invention in its broader aspects, and the invention, therefore, as defined in the appended claims, is intended to cover all such changes and modifications as to fall within the true spirit of the invention.

What is claimed is:

1. A method of receiving data signals having identical contents and different frequencies, comprising the steps of:

analyzing the frequency position of the data signal by use of FFT;

using the analysis of the frequency position to control a plurality of local oscillators for mixing the input frequencies of the data signals to IF signals such that, through separate mixing of the data-signal components, the individual partial waves of the data signals are frequency-corrected to a common IF mean frequency; and then superpositioning the frequency corrected common IF mean frequency partial waves.

2. The method according to claim 1, wherein the mixing of the input frequencies to IF signals is performed in analog fashion through separate mixing stages prior to an A/D conversion.

3. The method according to claim 1, wherein the mixing of the input frequencies to IF signals is performed in digital fashion through separate mixing stages after an A/D conversion.

4. The method according to claim 1, further comprising matching signal transit times of the partial waves to one another by respective time-delay members.

5. The method according to claim 1, wherein the FFT analysis is performed for finding different frequencies in the transmission of the signal by one or a plurality of transmitters.

6. The method according to claim 5, wherein Doppler-shifted partial waves are also analyzed during the FFT analysis, with the position relative to the transmitter and the inherent speed of the receiving object being used in the analysis.

7. The method according to claim 1, further comprising weighting the partial waves of identical IF frequency with a weighting related to the respective signal level prior to the superpositioning.

8. The method according to claim 7, further comprising matching signal transit times of the partial waves to one another by respective time-delay members.

9. The method according to claim 8, wherein the FFT analysis is performed for finding different frequencies in the transmission of the signal by one or a plurality of transmitters.

\* \* \* \* \*